(12) United States Patent
Jerauld et al.

(10) Patent No.: US 12,320,100 B2
(45) Date of Patent: Jun. 3, 2025

(54) AUTOMATIC MODE FOR OBJECT DETECTION RANGE SETTING

(71) Applicant: Deere & Company, Moline, IL (US)

(72) Inventors: Alek D. Jerauld, Dubuque, IA (US); Keith J. Lensing, Asbury, IA (US)

(73) Assignee: Deere & Company, Moline, IL (US)

( * ) Notice: Subject to any disclaimer, the term of this patent is extended or adjusted under 35 U.S.C. 154(b) by 302 days.

(21) Appl. No.: 17/960,407

(22) Filed: Oct. 5, 2022

(65) Prior Publication Data

US 2024/0117604 A1 Apr. 11, 2024

(51) Int. Cl.
  *E02F 9/26* (2006.01)
  *E02F 9/20* (2006.01)
  *G05D 1/00* (2024.01)

(52) U.S. Cl.
  CPC .............. *E02F 9/264* (2013.01); *E02F 9/205* (2013.01); *G05D 1/0038* (2013.01); *G05D 1/0238* (2013.01)

(58) Field of Classification Search
  CPC ........ E02F 9/264; E02F 9/205; G05D 1/0038; G05D 1/0238
  USPC ............................................................ 701/50
  See application file for complete search history.

(56) References Cited

U.S. PATENT DOCUMENTS

| 11,320,830 B2 | 5/2022 | Moorehead et al. |
| 2005/0082809 A1* | 4/2005 | Dix ....................... E02F 9/2203 280/764.1 |
| 2014/0208728 A1* | 7/2014 | Ma ......................... E02F 9/123 91/363 R |
| 2020/0378491 A1* | 12/2020 | David .................... F16H 59/18 |
| 2021/0169002 A1* | 6/2021 | Nakabayashi ....... G05D 1/0274 |
| 2021/0298220 A1* | 9/2021 | Kean .................... A01B 69/004 |
| 2022/0057802 A1 | 2/2022 | Spielman, Jr. |
| 2022/0266841 A1* | 8/2022 | Shintani .............. G05D 1/0214 |

FOREIGN PATENT DOCUMENTS

JP 6559464 B2 * 8/2019
JP 6991665 B2 * 2/2022

* cited by examiner

*Primary Examiner* — Hunter B Lonsberry
*Assistant Examiner* — Helen Li
(74) *Attorney, Agent, or Firm* — Lucian Wayne Beavers; Patterson Intellectual Property Law PC

(57) ABSTRACT

Methods and apparatus are provided for automatically changing an obstacle detection range setting of an obstacle detection system based at least in part on a determination of a change in work state of a self-propelled vehicle. The change in work state may be a change from a transport state in which the vehicle is moving across a ground surface, to a stationary operating state. Upon detecting a change to a stationary operating state the obstacle detection range may be automatically changed to a shorter range. Upon detecting a change to a transport state the obstacle detection range may be automatically changed to a longer range.

16 Claims, 6 Drawing Sheets

AUTOMATIC MODE FOR OBJECT DETECTION RANGE SETTING

FIELD OF THE DISCLOSURE

The present disclosure relates to methods of detecting obstacles in a working area of a self-propelled work vehicle.

BACKGROUND

A work vehicle such as an excavator is known to include an imaging system providing a surround view (bird's eye view) that displays on a touchscreen display. The excavator includes an object or obstacle detection system that detects objects up to some distance from the machine. The object detection system sends the coordinates of an object to the display which visually shows the relative location of the object to the machine and generates an audible tone. A maximum detection range can be manually adjusted through the display. The detection range can be set for example to a long, a medium, or a short range.

During normal excavation operation when the machine is stationary the operator is aware of the general surroundings of the machine and may want the detection range to be just outside the machine's swing radius or swing angle. During repositioning of the machine when the excavator is moving across a ground surface the operator may want maximum detection coverage around the machine and may manually switch the detection range to the long range.

There is a need for improved control systems which may assist the operator in switching between detection ranges.

SUMMARY OF THE DISCLOSURE

In one embodiment a method of detecting obstacles in a working area of a self-propelled work vehicle comprises steps of:
(a) receiving work state signals from one or more machine parameter sensors corresponding to a work state of the work vehicle, wherein different combinations of work state signal values correspond to different ones of a plurality of work states of the work vehicle;
(b) determining a change in the work state based at least in part on the work state signals;
(c) receiving obstacle signals from one or more obstacle sensors corresponding to a detected presence or absence of an obstacle within an object detection range relative to the work vehicle; and
(d) automatically adjusting the object detection range based at least in part on the determined change in the work state.

In a further embodiment a self-propelled work vehicle may include a machine frame, a plurality of wheels or tracks supporting the machine frame from a ground surface, at least one of the wheels or tracks being powered to propel the work vehicle, and one or more work implements supported from the machine frame. The vehicle may further include one or more machine parameter sensors configured to generate work state signals corresponding to a work state of the work vehicle and one or more obstacle sensors configured to generate obstacle signals corresponding to a detected presence or absence of obstacles within an object detection range relative to the work vehicle. An imaging system may be configured to display an image of the working area at an operator's station of the work vehicle and to display a relative location of a detected object in the image of the working area. A controller may be communicatively linked to the one or more machine parameter sensors and the one or more obstacle sensors, and configured to:
receive work state signals from the one or more machine parameter sensors corresponding to the work state of the work vehicle;
determine a change in the work state based at least in part on the work state signals;
receive obstacle signals from the one or more obstacle sensors corresponding to the detected presence or absence the obstacles within the object detection range relative to the work vehicle; and
generate output signals to adjust the object detection range based at least in part on the determined change in the work state.

Numerous objects, features and advantages of the present invention will be readily apparent to those skilled in the art upon a review of following description in conjunction with the accompanying drawings.

DETAILED DESCRIPTION

Figure 1:
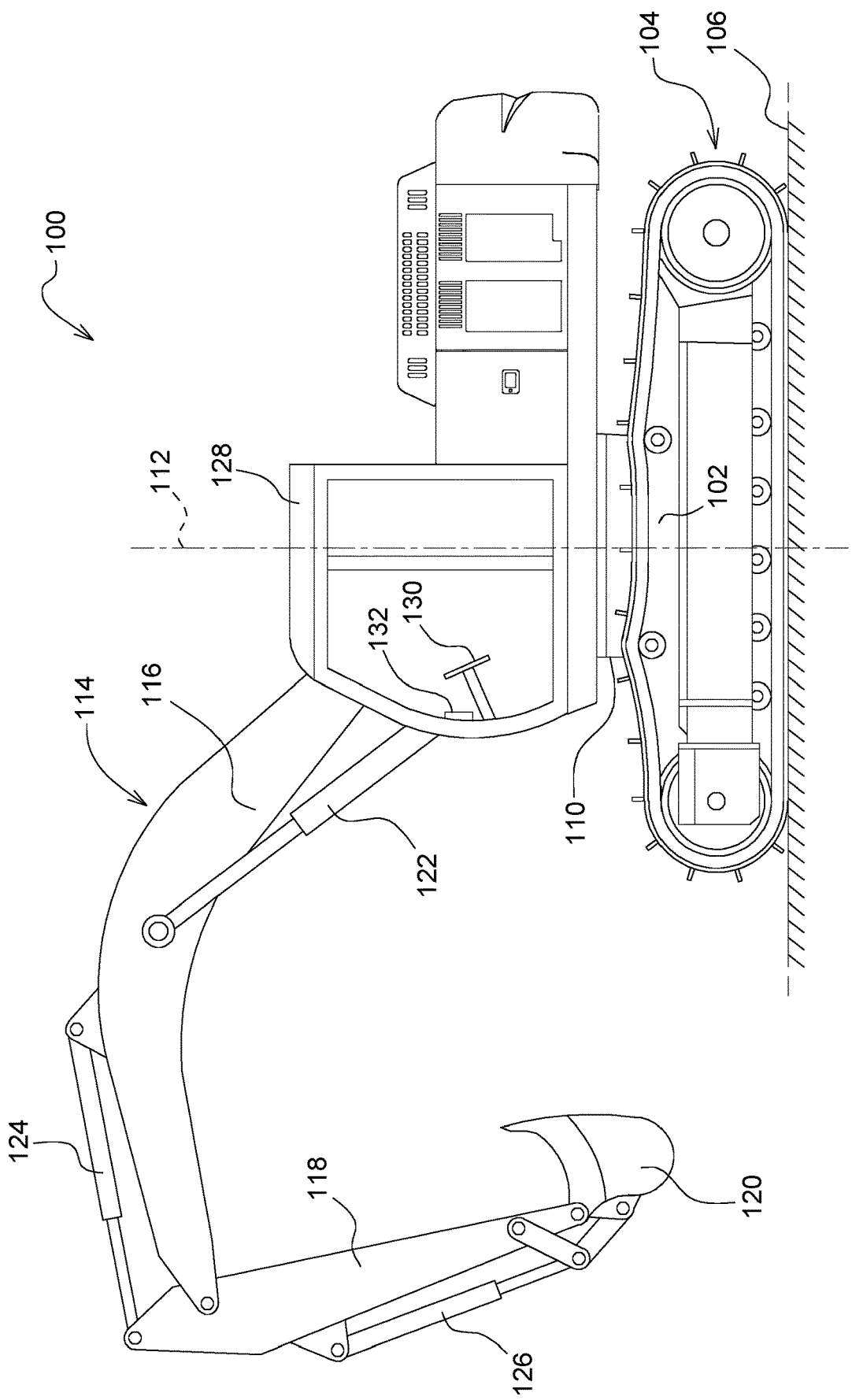
FIG. 1 is a left side elevation view of a self-propelled work machine, in this case an excavator.
Figure 2:
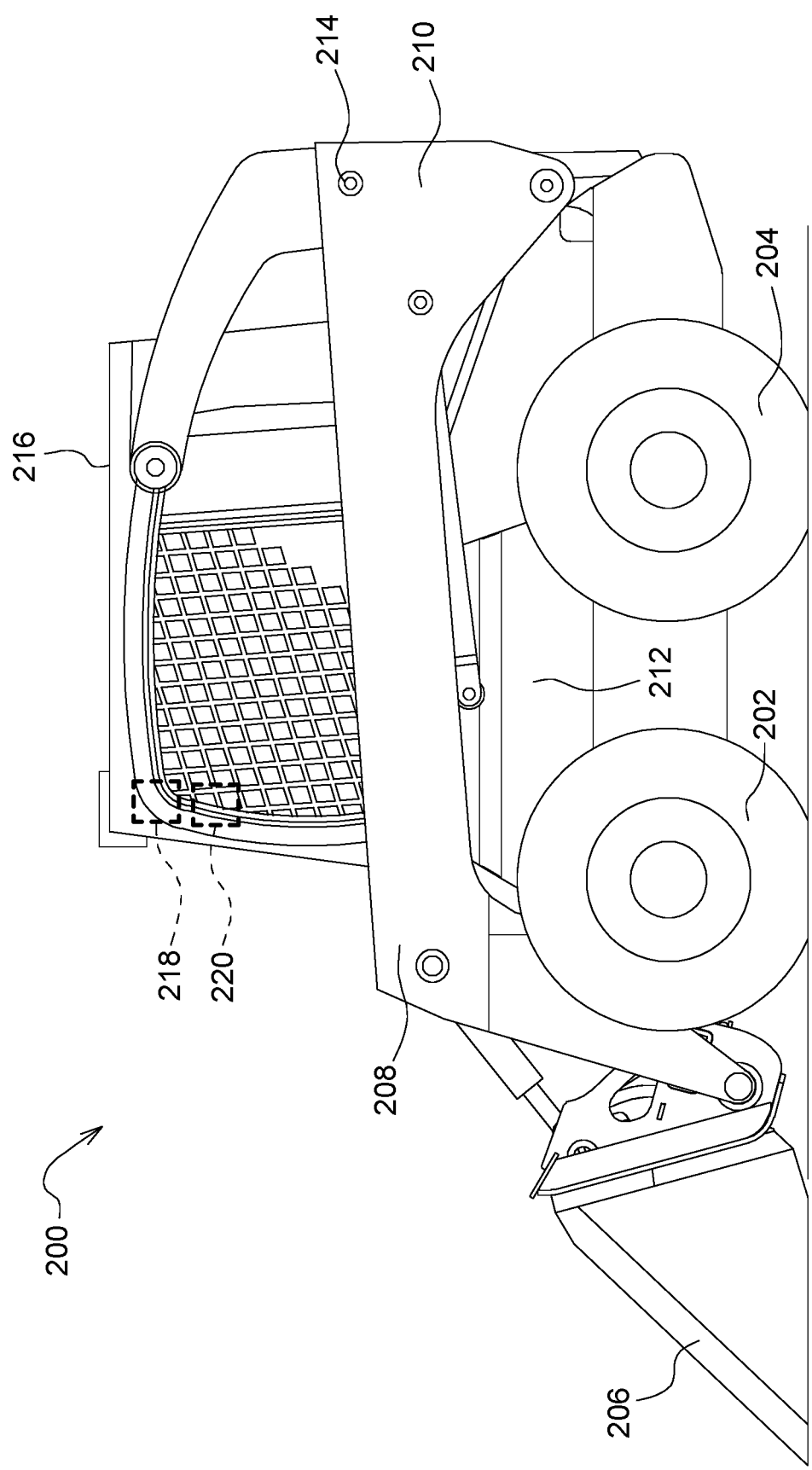
FIG. 2 is a left side elevation view of a self-propelled work machine, in this case a skid steer loader.

Referring now to the drawings and particularly to FIG. 1, a representative work vehicle is shown and generally designated by the number 100. FIG. 1 shows a tracked excavator machine 100. A second exemplary work vehicle in the form of a skid steer loader is shown in FIG. 2 and indicated by the number 200.

The systems disclosed herein are applicable to similar or otherwise equivalent vehicles, excavator machines, loaders, and other working machines of the type having one or more working implements for modifying the proximate terrain. Work vehicles as discussed herein may typically have tracked or wheeled ground engaging units supporting the undercarriage from the ground surface.

The illustrated and exemplary work vehicle 100 of FIG. 1 includes an undercarriage 102 which may also be referred as a machine frame 102. Vehicle 100 includes two tracked ground engaging units 104 for supporting the machine frame 102 from a ground surface 106. Each of the tracks is powered by a track drive to propel the vehicle 102.

An upper frame 108 is supported by the undercarriage 102 via a swing bearing 110 such that the upper frame 108 is pivotable about a pivot axis 112 relative to the undercarriage. The pivot axis 112 is substantially vertical when the ground surface 106 engaged by the ground engaging units 104 is substantially horizontal. A swing motor (not shown)

is configured to pivot the upper frame 108 on the swing bearing 110 about the pivot axis 112 relative to the undercarriage 102.

The work vehicle as disclosed herein typically includes one or more working implements 114 which as illustrated for example in FIG. 1 may collectively define a boom assembly 114 including a boom 116, an arm 118 pivotally connected to the boom 116, and a working tool 120. The boom 116 in the present example is pivotally attached to the upper frame 108 to pivot about a generally horizontal axis relative to the upper frame 108. The working tool in this embodiment is an excavator shovel or bucket 120 which is pivotally connected to the arm 118. The boom assembly 114 extends from the upper frame 108 along a working direction of the boom assembly. The working direction can also be described as a working direction of the boom.

A boom cylinder 122 controls pivotal movement of the boom 116 relative to the upper frame 108. An arm cylinder 124 controls pivotal movement of the arm 118 relative to the boom 116. A bucket cylinder 126 controls pivotal movement of the bucket 120 relative to the arm 118.

An operator's cab 128 may be located on the upper frame 108. The operator's cab 128 and the one or more working implements 114 may both be mounted on the upper frame 108 so that the operator's cab faces in the working direction of the working implements. A control station including a user interface 130 may be located in the operator's cab. A display 132 may be located in the operators cab 128.

As shown in FIG. 2 ground engaging units for the skid steer loader 200 include a pair of front wheels 202 and a pair of rear wheels 204. The work vehicle 200 may further include at least one drive unit (not shown) including for example a travel motor for driving the respective ground engaging units. In a conventional skid steer loader, the operator can manipulate controls to drive the left-side wheels and the right-side wheels at different speeds to thereby steer the work vehicle. While the left-side wheels and the right-side wheels in such a configuration are typically maintained in a longitudinal orientation with respect to the machine frame, the vehicle is nonetheless capable of rotation in substantially a zero-degree radius about a vertical axis.

A lift mechanism for the work vehicle 200 may typically include one or more work implements 206 such as a loader bucket pivotally coupled to a forward portion of an arm 208 on either side of the work vehicle, wherein the arms are themselves further connected to respective side portions 210 of a machine frame 212 and pivotable about at least one generally horizontal axis 214 relative to the main frame 212.

An operator's cab 216 may be located on the main frame 212. The operator's cab 216 and the one or more working implements 206 may both be mounted on the main frame 212 so that the operator's cab 216 faces in the working direction of the working implements 206. A control station including a user interface 218 and a display 220 may be located in the operator's cab 216.

Figure 3:
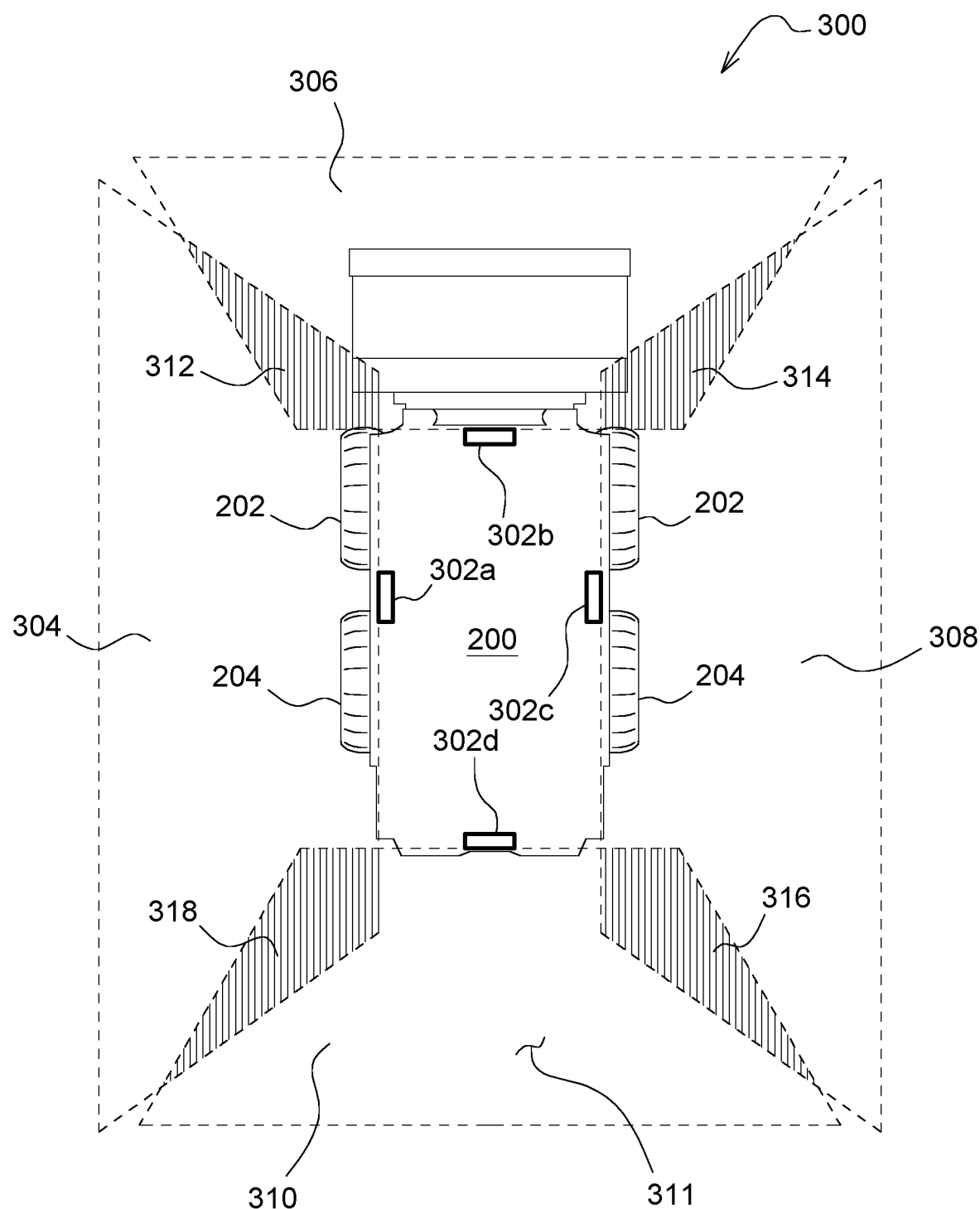
FIG. 3 is an overhead schematic view representing an exemplary bird's eye view with overlapping image regions for associated image capturing devices implemented on the skid steer loader of FIG. 2.

Either of the work vehicles 100 or 200 may include an imaging system. FIG. 3 schematically represents a bird's eye imaging system 300 installed on the work vehicle 200. A single Bird's Eye View may be stitched from images obtained from the several cameras 302.

Referring to FIG. 3, such an embodiment is implemented using four cameras 302, but alternative configurations may be desirable for certain types of work vehicles and are fully considered within the scope of the present disclosure. The four cameras may include a first camera 302a mounted on a left side of the work vehicle and arranged to capture a first viewing area 304, a second camera 302b mounted on a front side of the work vehicle and arranged to capture a second viewing area 306, a third camera 302c mounted on a right side of the work vehicle and arranged to capture a third viewing area 308, and a fourth camera 302d mounted on a rear side of the work vehicle and arranged to capture a fourth viewing area 310. The viewing areas 304, 306, 308 and 310 may collectively make up a working area 311 around the work vehicle 200.

The position and size of the viewing area recorded by a respective camera 302 may typically depend on the arrangement and orientation of the camera on the machine frame and further on the camera lens system, in particular the focal length of the lens of the camera.

The positions and sizes of the viewing areas in FIG. 3 should accordingly only be considered as exemplary, as they will vary for any number of parameters in a particular implementation. In an embodiment, each camera may be fastened to the machine frame at a specific setting angle in relation to the plane of the machine frame, so that the viewing direction of the camera is inclined downwardly in a sloping manner to the ground surface when the machine frame is oriented parallel to the ground surface. Whereas each camera 302a, 302b, 302c, 302d would record a substantially rectangular image detail of the ground surface if the viewing direction of the camera was orthogonal to the ground surface, in accordance with the above-referenced setting angles a trapezoidal image region of the ground surface is recorded by each camera. The course of the Bird's Eye View stitching may depend on the position and size of the overlapping trapezoidal image details 312, 314, 316 and 318.

The terms "left", "right", "front", and "rear" as used herein may refer to the conventional use of the terms relative to a working direction of the work vehicle. In other words, for a skid-steer loader having a work implement as illustrated, the front side of the vehicle would correspond to a leading edge of the vehicle when traveling in a working direction. However, the terms are not intended as limiting on the scope of the disclosure, and alternative arrangements are reasonably contemplated.

Figure 4:
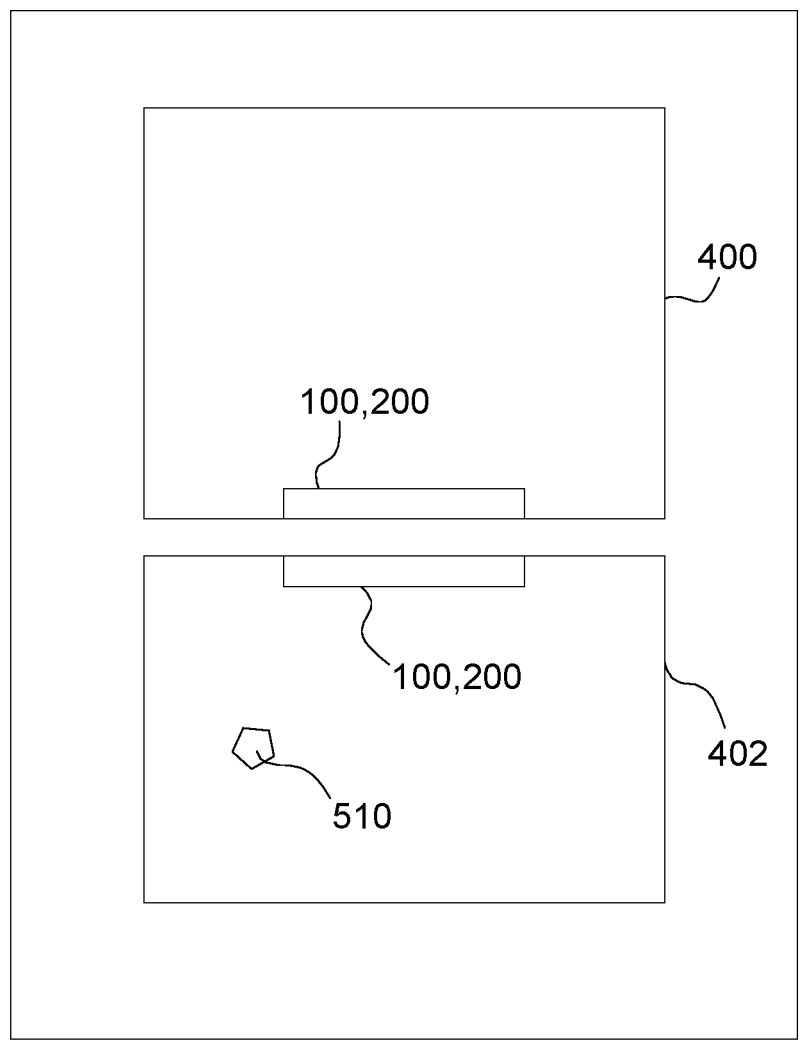
FIG. 4 is a schematic depiction of a display in the operator's station portraying the bird's eye image of the working area surrounding the work vehicle, with obstacle locations superimposed upon the image.

FIG. 4 schematically shows the display 132 or 220 of the work vehicles 100 or 200. This display may be located in the respective operator's cabins of the vehicles and may include a forward display screen 400 showing the view in the forward working direction from the operator's cabin, and a rearward display screen 402 showing the view in the rearward direction from the operator's cabin.

Figure 5:
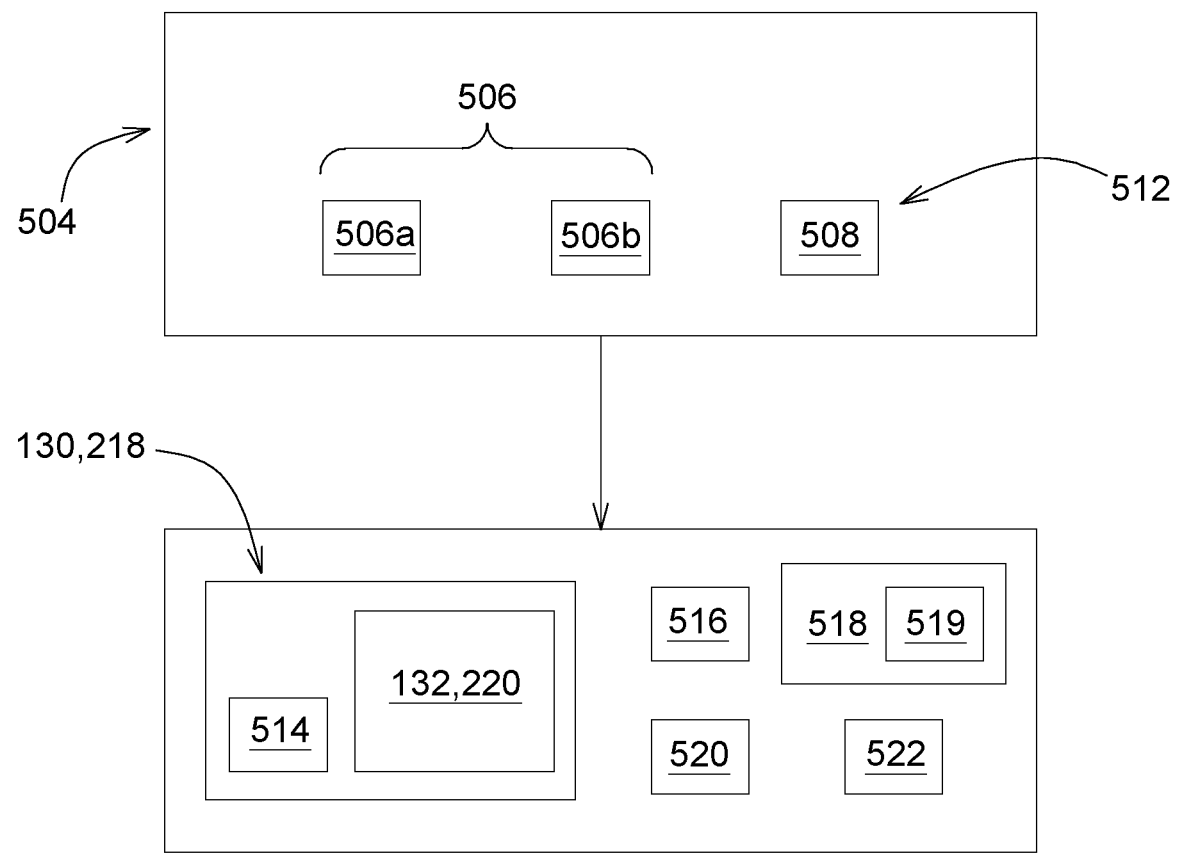
FIG. 5 is a schematic drawing of a control system for the work vehicle.

As schematically illustrated in FIG. 5, the work vehicle 100 or 200 includes a control system 500 including a controller 502. The controller 502 may be part of the machine control system of the work vehicle, or it may be a separate control module. The controller may include the user interface 130 or 218 and optionally be mounted in the operators cab 128 or 216 at a control panel.

The controller 502 is configured to receive input signals from some or all of various sensors collectively defining a sensor system 504. The sensor system may include one or more machine parameter sensors 506 and one or more obstacle sensors 508.

The machine parameter sensors 506 may be configured to detect machine operating conditions or positioning, including for example an orientation sensor, global positioning system (GPS) sensors, vehicle speed sensors, vehicle implement positioning sensors, and the like, and whereas one or more of these sensors may be discrete in nature the sensor system may further refer to signals provided from the machine control system.

Other sensors in the sensor system 504 more particularly refer to a group of sensors referred to herein as object sensors or obstacle sensors 508 for detecting the presence or absence of an obstacle within an obstacle detection range relative to the work vehicle. Various examples of obstacle sensors 508 are conventionally known and may include ultrasonic sensors, laser scanners, radar wave transmitters and receivers, thermal sensors, imaging devices, structured light sensors, and other optical sensors. The types and combinations of obstacle sensors may vary for a type of work vehicle, work area, and/or application, but generally are provided and configured to optimize recognition of obstacle proximate to, or otherwise in association with, a determined working area of the vehicle. In some embodiments the obstacle sensors, which hereinafter may be referred to for illustrative but non-limiting purposes as ultrasonic sensors, may include the ability to determine an obstacle position as well as an obstacle distance.

The obstacle sensors 508 and the associated signal processing system may be referred to as an obstacle detection system 512. The obstacle detection system 512 may be adjustable so as to focus on objects within a shorter range, a medium range or a longer range from the work vehicle. The human operator may be provided with a manual detection range control 514 as part of the user interface 130 or 218 which allows the operator to select the focus of the obstacle detection system. For example, the shorter range may be within 1 m of the machine frame, the medium range may be withing 3 m of the machine frame, and the longer range may be within 5 m of the machine frame. Other ranges may be used.

The controller 502 may typically produce an output to the display 132 or 220 for display to the human operator regarding the determined positions of detected objects. For example, in FIG. 4 an exemplary obstacle 510 is shown superimposed on the image of the display.

In one embodiment the controller 502 may include an automatic mode for object detection range setting. When the work vehicle is operating in a transport mode where the work vehicle is moving across the ground surface it may be desired to operate the obstacle detection system 512 having a larger or longer object detection range extending well beyond the work implements so as to detect distant obstacles well ahead of time. But when the work vehicle stops and is in an operating mode where it is manipulating the work implement it may be desired to focus the obstacle detection in the immediate vicinity of the work vehicle and particularly in the immediate vicinity of the working implement.

The operation of the work vehicle in a transport mode or transport state where the work vehicle is moving across the ground surface may be referred to as a first work state. The operation of the work vehicle in a stationary operating mode where the work vehicle is not moving across the ground surface and the work implement is moving relative to the machine frame to perform a work function may be referred to as a second work state.

The machine parameter sensors 506 may provide signals or data to the controller 502 from which the controller 502 may determine the work state of the work vehicle. The controller 502 may then determine whether there has been a change in work state and may adjust the obstacle detection range of the obstacle detection system at least in part based on the determined change in work state.

The machine parameter sensors 506 may include vehicle movement sensors 506a which generate signals and data indicating whether the work vehicle is moving across the ground surface. Examples of such vehicle movement sensors 506a include throttle position sensors, speedometers, rotary sensors on the wheels or tracks, and other sensors associated with the drive train of the work vehicle.

The machine parameter sensors 506 may further include work implement movement sensors 506b which generate signals and data corresponding to movement of the work implements 114, 206 relative to the machine frames of the respective work vehicles. For example, on the excavator 100, one work implement movement sensor 506b may be a boom angle sensor for measuring a swing angle of the excavator boom 116 about the axis 112 relative to the machine frame 102.

The controller 502 includes or may be associated with a processor 516, a computer readable medium 518, a communication unit 520, a data storage 522 such as for example a database network, and the aforementioned user interface 130 or 218 having a display 132 or 220. An input/output device 514, such as a keyboard, joystick or other user interface tool, which may be the previously mentioned manual detection range control 514, is provided so that the human operator may input instructions to the controller. It is understood that the controller described herein may be a single controller having all of the described functionality, or it may include multiple controllers wherein the described functionality is distributed among the multiple controllers.

Various operations, steps or algorithms as described in connection with the controller 502 can be embodied directly in hardware, in a computer program product 519 such as a software module executed by the processor 516, or in a combination of the two. The computer program product 519 can reside in RAM memory, flash memory, ROM memory, EPROM memory, EEPROM memory, registers, hard disk, a removable disk, or any other form of computer-readable medium 518 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 520 may support or provide communications between the controller and external systems or devices, and/or support or provide communication interface with respect to internal components of the working machine. The communications unit may include wireless communication system components (e.g., via cellular modem, WiFi, Bluetooth or the like) and/or may include one or more wired communications terminals such as universal serial bus ports.

Data storage as discussed herein may, unless otherwise stated, generally encompass hardware such as volatile or non-volatile storage devices, drives, memory, or other storage media, as well as one or more databases residing thereon.

Automatic Mode for Object Detection Range Setting:

The controller 502 may be provided with an automatic mode for object detection range setting via appropriate software programming 519. Such an automatic mode for object detection range setting may provide for automatic implementation of a method of detecting obstacles 514 in a working area surrounding the work vehicle 100 or 200.

For example, when the work vehicle is in a transport state in which it is moving from one location to another it may be desired to detect obstacles within a first larger range so as to warn the operator of obstacles that may collide with the moving vehicle. But when the vehicle has stopped and is in a stationary operating state it may be desired to reduce the detection range to the immediate area in which the working implement may be operated, so as to focus on obstacles that may be impacted by the working implement.

Figure 6:
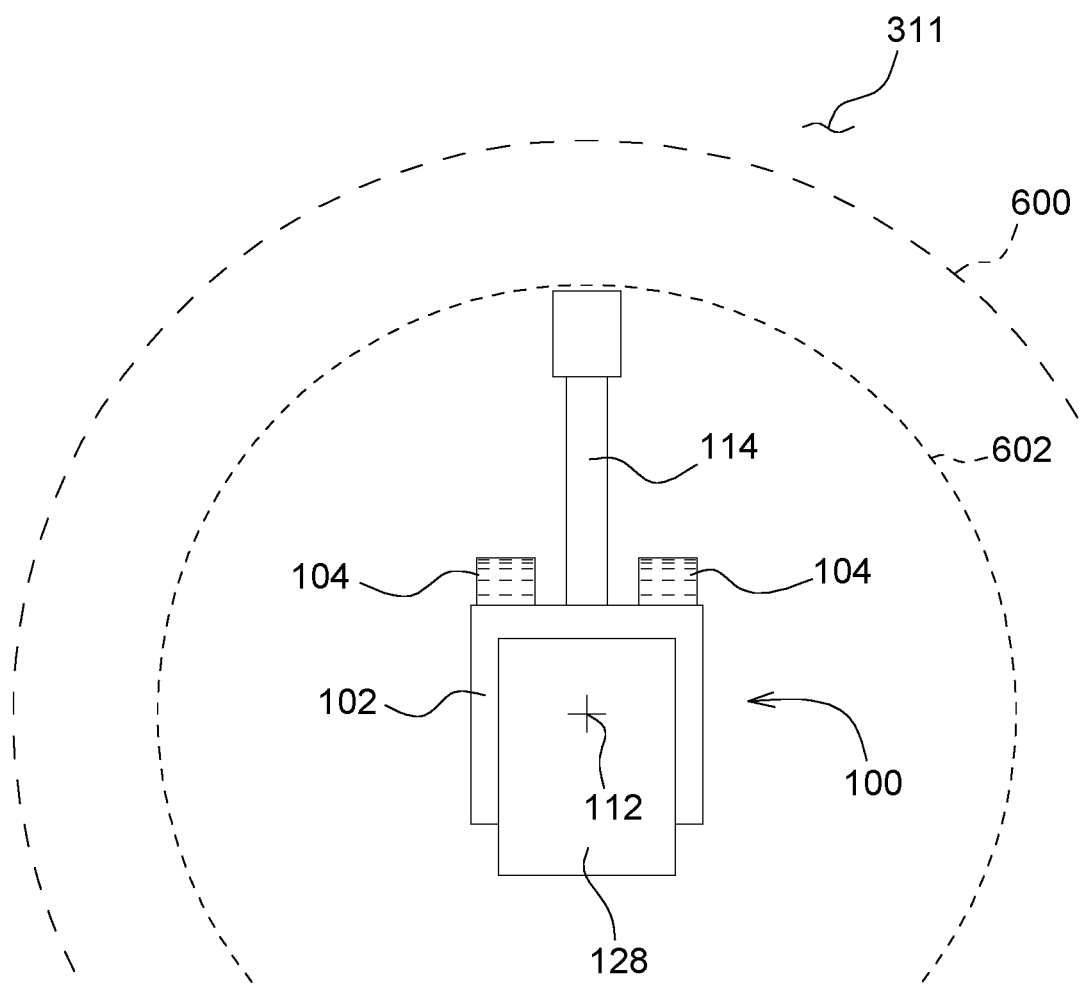
FIG. 6 is a schematic plan view of the excavator of FIG. 1 showing longer and shorter obstacle detection ranges around the excavator.

FIG. 6 schematically shows this concept for the excavator 100, in which the first longer detection range is designated by the circular boundary 600, and the second shorter detection range is designated by the circular boundary 602.

The controller 502 may examine work state signals from one or more of the machine parameter sensors 506 corresponding to a work state of the excavator 100, wherein different combinations of work state signal values correspond to different ones of a plurality of work states of the machine.

For example, a transport work state of the excavator 100 may be indicated by receipt of vehicle movement signals from the vehicle movement sensors 506a indicating that the excavator 100 is moving across the ground surface 106. Vehicle movement sensors 506a may include direct movement sensors such as a rotational sensor on the tracks 104 or a GPS sensor mounted on the vehicle 100. Vehicle movement sensors 506a may also include indirect indicators of vehicle movement such as a pedal command sensor, or a valve position sensor detecting the input of a vehicle movement command by the operator of the vehicle. Such an indirect vehicle movement sensor may include the detection of pedal command signals or valve command signals already present within the vehicle control system.

A stationary operating work state of the excavator 100, on the other hand, may be indicated by the receipt of signals from the vehicle movement sensors 506a indicating that the excavator 100 is not moving across the ground surface 106, in combination with signals from the work implement movement sensors 506b indicating that the boom assembly 114 and working tool 120 are moving relative to the machine frame 102 to perform working operations.

For example, the work implement movement sensors 506b for excavator 100 may include a boom angle detection sensor detecting rotational movement of the upper frame 108 relative to the machine frame 102 about pivot axis 112. Further work implement movement sensors 506b may include position sensors detecting the extension or retraction of each of the boom cylinder 122, arm cylinder 124 and bucket cylinder 126. The boom cylinder 122, arm cylinder 124 and bucket cylinder 126 may each be implemented as "smart" hydraulic cylinders having integrated positions sensors which function as the associated work implement movement sensors 506b.

The controller 502 may receive the vehicle movement signals from the vehicle movement sensors 506a and the work implement movement signals from the work implement movement sensors 506b, and determine when a change in work state has occurred.

The controller 502 may also receive obstacle signals from the one or more obstacle sensors 508 corresponding to a detected presence or absence of an obstacle 510 within an object detection range 600, 602 relative to the excavator 100. The controller 502 may automatically adjust the detection range 600, 602 based at least in part on the determined change in the work state. For example, when the controller 502 determines that the excavator 100 is in the transport state moving across the ground surface 106 the controller may send command signals causing the obstacle sensors 508 to be operative in the longer detection range 600 so as to maximize the information available to the operator about potential dangers to the moving vehicle. And when the controller determines that the excavator has stopped and is in a stationary operating state, the controller may send command signals causing the obstacle sensors 508 to be focused in the shorter detection range 602 in which the work implement 120 may move relative to the stationary machine frame 102.

The basic method of detecting obstacles 510 in the working area of the excavator 100 may be described as including steps of:
(a) receiving work state signals from one or more machine parameter sensors 506 corresponding to a work state of the work vehicle 100, wherein different combinations of work state signal values correspond to different ones of a plurality of work states of the work vehicle;
(b) determining a change in the work state based at least in part on the work state signals;
(c) receiving obstacle signals from one or more obstacle sensors 508 corresponding to a detected presence or absence of an obstacle 510 within an object detection range relative to the work vehicle 100; and
(d) automatically adjusting the object detection range 600, 602 based at least in part on the determined change in the work state.

In the method described above, the work state signals in step (a) may include vehicle movement signals from vehicle movement sensors 506a indicating whether the work vehicle 100 is moving across a ground surface 106, and work implement movement signals from work implement movement sensors 506b corresponding to movement of the work implement 114, 120 of the excavator 100 relative to the machine frame 102.

In the method described above step (b) may further include determining that the excavator 100 has changed from a transport state to a stationary operating state by determining that the excavator 100 is not moving across the ground surface 106, and by determining that the work implement 114, 120 has moved greater than a threshold value relative to the machine frame 102 within a predetermined time interval. For example, the controller 502 may determine whether the boom assembly 114 has rotated through an angle about axis 112 of greater than 20 degrees within a time interval of 30 seconds. A lesser angle of at least 5 degrees, or at least 10 degrees or at least 15 degrees could be used.

Another example of how the controller 502 may detect an operating state is to determine that repetitive cycles of movement of the working implement 114, 120 have occurred while the machine is stationary. Operating states may also be indicated by higher engine speeds and/or known operational patterns of an operator input such as a joystick. Operating states may be determined by observing movement of the bucket 120, such as detecting a sequence of bucket movement indicating a bucket boom curl when the boom is down, followed by a dumping operation to an outer location.

Upon determining that the excavator 100 has changed from a transport state to a stationary operating state, the controller 502 may generate output signals to adjust the object detection range from the longer range 600 to the shorter range 602. The controller may also be programed such that the change from the longer range 600 to the shorter range 602 is delayed until a predetermined time interval or delay has occurred, so as to insure that the excavator 100 is truly in a stationary mode. For example, the controller may wait until the excavator 100 has been stationary for at least 10 seconds, or preferably at least 20 seconds, before reducing the object detection range setting. A lesser stationary time of at least 1 second or at least 5 seconds could also be used.

After determining that the excavator 100 is again moving across the ground surface 106, the controller 502 may automatically return the object detection range to the longer range 600.

As previously noted, the vehicle movement sensors 506a may include direct movement sensors such as a rotational sensor on the tracks 104 or a GPS sensor mounted on the vehicle 100, or indirect indicators of vehicle movement such as a throttle input, a pedal command sensor, or a valve position sensor detecting the input of a vehicle movement command by the operator of the vehicle.

Determination of vehicle movement from direct movement sensors may be described as detecting an actual change in the work state based at least in part on the work state signals. Determination of vehicle movement from indirect movement sensors may be described as predicting a future change in the work stated based at least in part on the work state signals from the indirect movement sensors.

The controller 502 may display an image of the working area surrounding the vehicle 100, 200 on the display 132, 220 at the operator station 128, 216 of the work vehicle 100, 200 as seen in FIG. 4. The controller 502 may display a relative location 510 of the detected object in the image of the working area as also schematically shown in FIG. 4.

The controller 502 may also take into consideration other information in determining whether to place the obstacle detection range setting in a longer or shorter range. The controller may receive GPS data from which it can determine when the vehicle is in a known working area. The controller may consider known obstacles in the work area, which may for example be in the form of a "virtual fence" in which boundaries have been established beyond which the machine or its working implement should not go.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims Each disclosed feature or embodiment may be combined with any of the other disclosed features or embodiments.

What is claimed is:

1. A method of detecting obstacles in a working area of a self-propelled work vehicle, the method comprising steps of:
   receiving work state signals from one or more machine parameter sensors corresponding to a work state of the work vehicle, wherein different combinations of work state signal values correspond to different ones of a plurality of work states of the work vehicle;
   determining a change in the work state from a transport state to a stationary operating state based at least in part on the work state signals;
   receiving obstacle signals from one or more obstacle sensors corresponding to a detected presence or absence of an obstacle within an obstacle detection range relative to the work vehicle;
   automatically adjusting the obstacle detection range based at least in part on the determined change in the work state; and
   wherein the automatically adjusting includes after determining that the work vehicle has changed from the transport state to the stationary operating state, and after expiration of a predetermined time interval, adjusting the obstacle detection range from a first range to a second range shorter than the first range;
   wherein the predetermined time interval is at least 10 seconds.

2. The method of claim 1, further comprising:
   upon determining that the vehicle is again moving across a ground surface, returning the obstacle detection range to the first range.

3. The method of claim 1, wherein the predetermined time interval is at least 20 seconds.

4. The method of claim 1, wherein the determining further comprises:
   detecting an actual change in the work state based at least in part on the work state signals.

5. The method of claim 1, wherein the determining further comprises:
   predicting a future change in the work state based at least in part on the work state signals.

6. The method of claim 1, further comprising:
   displaying an image of the working area at an operator's station of the work vehicle; and
   displaying a relative location of a detected obstacle in the image of the working area.

7. The method of claim 1, wherein the work state signals include:
   vehicle movement signals indicating whether the work vehicle is moving across a ground surface; and
   work implement movement signals corresponding to movement of a work implement of the work vehicle relative to a machine frame of the work vehicle.

8. The method of claim 7, wherein the vehicle movement signals include signals from a throttle input.

9. The method of claim 7, wherein the work implement movement signals includes signals from a work implement position sensor.

10. The method of claim 7, wherein determining a change in the work state based at least in part on the works state signals further comprises:
    determining that the work vehicle has changed from a transport state to a stationary operating state by determining that:
    the work vehicle is not moving across the ground surface; and
    the work implement has moved greater than a threshold value relative to the machine frame within a predetermined time interval.

11. The method of claim 10, the work vehicle being an excavator and the work implement being an excavator boom, wherein:

the threshold value is a boom swing angle of the excavator boom relative to the machine frame of at least 20 degrees.

12. A self-propelled work vehicle, comprising:
a machine frame;
a plurality of wheels or tracks supporting the machine frame from a ground surface, at least one of the wheels or tracks being powered to propel the work vehicle;
one or more work implements supported from the machine frame;
one or more machine parameter sensors configured to generate work state signals corresponding to a work state of the work vehicle;
one or more obstacle sensors configured to generate obstacle signals corresponding to a detected presence or absence of obstacles within an obstacle detection range relative to the work vehicle;
an imaging system configured to display an image of a working area at an operator's station of the work vehicle and to display a relative location of a detected obstacle in the image of the working area; and
a controller communicatively linked to the one or more machine parameter sensors and the one or more obstacle sensors, and configured to:
receive work state signals from the one or more machine parameter sensors corresponding to the work state of the work vehicle;
determine a change in the work state based at least in part on the work state signals;
receive obstacle signals from the one or more obstacle sensors corresponding to the detected presence or absence of obstacles within the obstacle detection range relative to the work vehicle;
generate output signals to adjust the obstacle detection range based at least in part on the determined change in the work state;
determine that the work vehicle has changed from a transport state to a stationary operating state by determining that:

the work vehicle is not moving across the ground surface; and
the one or more work implements has moved greater than a threshold value relative to the machine frame within a predetermined time interval; and
after determining that the work vehicle has changed from the transport state to the stationary operating state, and after expiration of a second predetermined time interval, generate an output signal to adjust the obstacle detection range from a first range to a second range shorter than the first range, wherein the second predetermined time interval is at least 10 seconds.

13. The self-propelled work vehicle of claim 12, wherein the controller is further configured to:
generate an output signal to return the obstacle detection range to the first range upon determining that the vehicle is again moving across the ground surface.

14. The self-propelled work vehicle of claim 12, wherein the controller is further configured to:
generate the output signals to adjust the obstacle detection range to the first range extending beyond a range of motion of the one or more work implements when the work vehicle is in the transport state and to adjust the obstacle detection range to the second range greater than or equal to the range of motion of the one or more working implements when the work vehicle is in the stationary operating state.

15. The self-propelled work vehicle of claim 12, wherein:
the work vehicle is an excavator including an excavator boom mounted on the machine frame so as to pivot through a boom pivot angle about a vertical pivot axis relative to the machine frame; and
the one or more machine parameter sensors includes a boom angle sensor for detecting the boom pivot angle.

16. The self-propelled work vehicle of claim 12, wherein the second predetermined time interval is at least 20 seconds.

* * * * *